(12) United States Patent
Joo et al.

(10) Patent No.: US 8,014,841 B2
(45) Date of Patent: Sep. 6, 2011

(54) MOBILE TERMINAL

(75) Inventors: Won Seok Joo, Seoul (KR); Kwang Hyun Ann, Seoul (KR)

(73) Assignee: LG Electronics Inc., Seoul (KR)

( * ) Notice: Subject to any disclaimer, the term of this patent is extended or adjusted under 35 U.S.C. 154(b) by 549 days.

(21) Appl. No.: 11/649,754

(22) Filed: Jan. 5, 2007

(65) Prior Publication Data

US 2008/0039159 A1    Feb. 14, 2008

(30) Foreign Application Priority Data

Aug. 22, 2006  (KR) .................. 10-2006-0079336

(51) Int. Cl.
*H04M 1/00*  (2006.01)
(52) U.S. Cl. ............... 455/575.4; 455/566; 455/90.3; 455/349
(58) Field of Classification Search .......... 455/550.1, 455/556.1, 557, 90.3, 575.1–575.9, 566, 455/347–351
See application file for complete search history.

(56) References Cited

U.S. PATENT DOCUMENTS

| 6,893,169 | B1  |   | 5/2005 | Exposito et al. |           |
|-----------|-----|---|--------|-----------------|-----------|
| 7,003,318 | B2  | * | 2/2006 | Kota et al.     | 455/556.1 |
| 7,228,151 | B2  | * | 6/2007 | Kota et al.     | 455/556.1 |
| 7,233,293 | B2  |   | 6/2007 | Ryu et al.      |           |
| 7,492,893 | B2  | * | 2/2009 | Ahn et al.      | 379/433.13|
| 7,532,169 | B2  | * | 5/2009 | Joo et al.      | 343/702   |
| 7,663,557 | B2  | * | 2/2010 | Joo et al.      | 343/702   |
| 2004/0095501 | A1 | * | 5/2004 | Aizawa et al. | 348/340 |
| 2004/0189853 | A1 |   | 9/2004 | Takeuchi et al. |       |
| 2004/0198307 | A1 |   | 10/2004 | Chang |         |
| 2004/0212718 | A1 | * | 10/2004 | Hiltunen et al. | 348/340 |
| 2005/0049019 | A1 | * | 3/2005 | Lee | 455/575.4 |
| 2005/0174468 | A1 | * | 8/2005 | Herranen et al. | 348/340 |
| 2006/0019696 | A1 | * | 1/2006 | Brunel et al. | 455/550.1 |
| 2006/0079302 | A1 | * | 4/2006 | Kota et al. | 455/575.3 |
| 2006/0097933 | A1 |   | 5/2006 | Lee |    |
| 2006/0125700 | A1 |   | 6/2006 | Kanazawa |  |
| 2006/0148541 | A1 | * | 7/2006 | Vance | 455/575.3 |
| 2006/0160570 | A1 | * | 7/2006 | Kamarainen | 455/557 |
| 2006/0196946 | A1 | * | 9/2006 | Tsai | 235/472.01 |
| 2007/0032260 | A1 | * | 2/2007 | Kim | 455/550.1 |
| 2008/0024893 | A1 |   | 1/2008 | Vanjani et al. |  |
| 2008/0220833 | A1 | * | 9/2008 | Lee et al. | 455/575.3 |
| 2009/0047997 | A1 | * | 2/2009 | Silverbrook et al. | 455/556.1 |

FOREIGN PATENT DOCUMENTS

| DE | 103 45 230 A1 | 4/2005 |
| EP | 0 658 030 A1 | 6/1995 |
| EP | 1 148 716 A1 | 10/2001 |
| EP | 1 213 924 A1 | 6/2002 |
| EP | 1 492 332 A2 | 12/2004 |
| EP | 1 750 417 A2 | 2/2007 |
| JP | 11-191865 A | 7/1999 |
| KR | 10-2006-0005063 A | 1/2006 |
| WO | WO-2004/066692 A | 8/2004 |
| WO | WO 2004/066692 A1 | 8/2004 |
| WO | WO-2006031078 A1 | 3/2006 |

* cited by examiner

*Primary Examiner* — Edward Urban
*Assistant Examiner* — RuiMeng Hu
(74) *Attorney, Agent, or Firm* — Birch, Stewart, Kolasch & Birch, LLP

(57) ABSTRACT

A mobile terminal having a housing, a circuitry supporting substrate located in the housing, the circuitry supporting substrate having an opening formed within the circuitry supporting substrate, and a camera extending into the opening of the circuitry supporting substrate.

13 Claims, 11 Drawing Sheets

MOBILE TERMINAL

CROSS REFERENCE TO RELATED APPLICATIONS

This application claims the benefit of Korean Patent Application No. 10-2006-0079336, filed on Aug. 22, 2006, which is hereby incorporated by reference as is fully set forth herein.

BACKGROUND OF THE INVENTION

1. Field of the Invention

The present invention relates to a mobile terminal, and more particularly, to a mobile terminal that can enhance user usage convenience with a slimmer terminal.

2. Description of Related Art

In general, a mobile terminal means a cellular phone, a PDA (Personal Digital Assistant), and the like, which a user can carry with himself/herself to send/receive various kinds of information, such as images, voices, and text massages via wireless communication or to receive various services via connection to a predetermined server.

That form of the mobile terminal, especially a cellular phone, has evolved from an initial bar type into a flip type, folder type, and a slide member type according to consumer demand and technical development.

Recently, the decreasing thickness of a mobile terminal has become a key part for the success of mobile terminal technology in satisfying a user's demand, because a user prefers a slimmer and lighter mobile terminal with a large display window to enjoy various multi-media functions as well as to talk on the terminal.

FIGS. 1 and 2 illustrate a conventional slide type mobile terminal. FIGS. 1 and 2 are side sectional views illustrating a state where a conventional mobile terminal slides up and slides down, respectively.

As shown in FIGS. 1 and 2, a conventional slide type mobile terminal includes a body 10 and a LCD (liquid crystal display) part 20. A main PCB (printed circuit board) 12 is embedded longitudinally from an upper end of the mobile terminal to a lower end thereof. The LCD part 20 is provided on a front surface of the body 10 to be capable of sliding on the front surface and has a LCD 22 therein to display various kinds of information.

The body 10 and the LCD part 20 dually split the conventional mobile terminal from the upper end to the lower end. The body 10 further includes an antenna, a keypad 14 and a battery 15. The antenna is an embedded antenna which transmits/receives a signal to/from a base station and the like. The keypad 14 is provided in a lower portion of the body 10 to be exposable by a user's sliding up the LCD part 20 so that he/she may use keys. The battery 15 is mounted to a rear surface of the body 10 to supply power to various sub-assemblies provided within the conventional mobile terminal. The LCD part 20 further includes a PCB 23 that is electrically connected to the LCD 22.

Also, a FPCB (flexible printed circuit board) 24 passes through the body 10 and the LCD part 20 to connect the main PCB 12 to the PCB 23 for the LCD 22. Although not shown in FIGS. 1 and 2, the conventional mobile terminal has a sliding device installed between the body 10 and the LCD part 20 to enable the LCD part 20 to slide upwardly.

However, because the main PCB and the PCB for LCD are vertically provided from the upper end to the lower end of the mobile terminal, it is difficult to reduce the overall thickness of the mobile terminal further.

As shown in FIGS. 1 and 2, there is useless space created partially within the body 10 and the LCD part 20. Thereby, the conventional mobile terminal has another problem of inappropriate space utility.

Furthermore, the conventional mobile terminal has still another problem in that it is difficult to make it slimmer, because the antenna should be installed in either the body or the LCD part.

Still further, the conventional mobile terminal has still another problem in that the upper part thereof is relatively lighter than the lower part when the LCD part slides up, thereby not affording much protection from impacts to the display.

Finally, the conventional mobile terminal has still another problem that it is limited to make it slimmer, because of the thickness of sliding device additionally installed between the body and the LCD part.

BRIEF SUMMARY OF THE INVENTION

An object of the present invention is to provide a mobile terminal which can enhance a user's usage convenience and satisfaction and which can overcome the limitation of a conventional slim mobile terminal to utilize what would otherwise be useless space and to make a mobile terminal slimmer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a housing, a circuitry supporting substrate located in the housing, the circuitry supporting substrate having an opening formed within the circuitry supporting substrate, and a camera extending into the opening of the circuitry supporting substrate.

In another aspect, the camera has a resolution ranging from at least 1.5 megapixels to 10 megapixels.

In a further aspect, the housing includes an internal member for supporting the circuitry supporting substrate. The internal member may include a wall structure configured to surround at least two edges of the camera. In addition, the camera may be connected to the circuitry supporting substrate by a flexible circuitry supporting substrate such that the camera does not contact the wall structure.

In still another aspect, the circuitry supporting substrate may be formed of at least a first and second circuitry supporting substrates. In addition, the housing may include a holding portion and one of the first and second circuitry supporting substrates is located in the holding portion where the circuitry supporting substrates located in the holding portion has the opening for the camera. When both of the first and second circuitry supporting substrates are located in the holding portion, the first and second circuitry supporting substrates are arranged in an overlapping arrangement. In addition, both the first and second circuitry supporting substrates may have an opening and the camera may extend into the opening of each of the first and second circuitry supporting substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
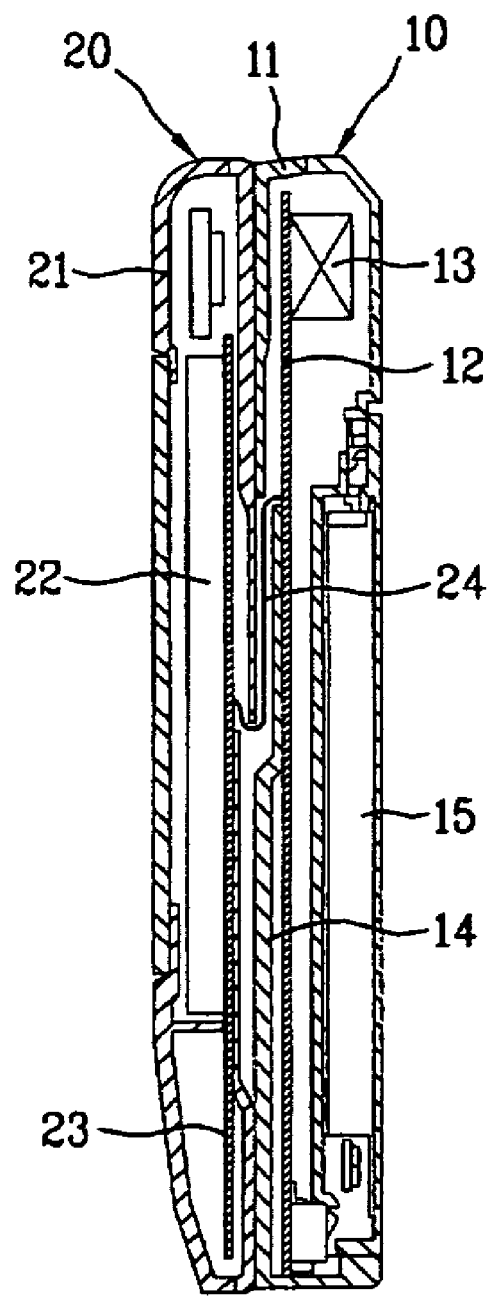
FIGS. 1 and 2 are side sectional views illustrating a state where a conventional mobile terminal slides up and slides down, respectively.
Figure 2:
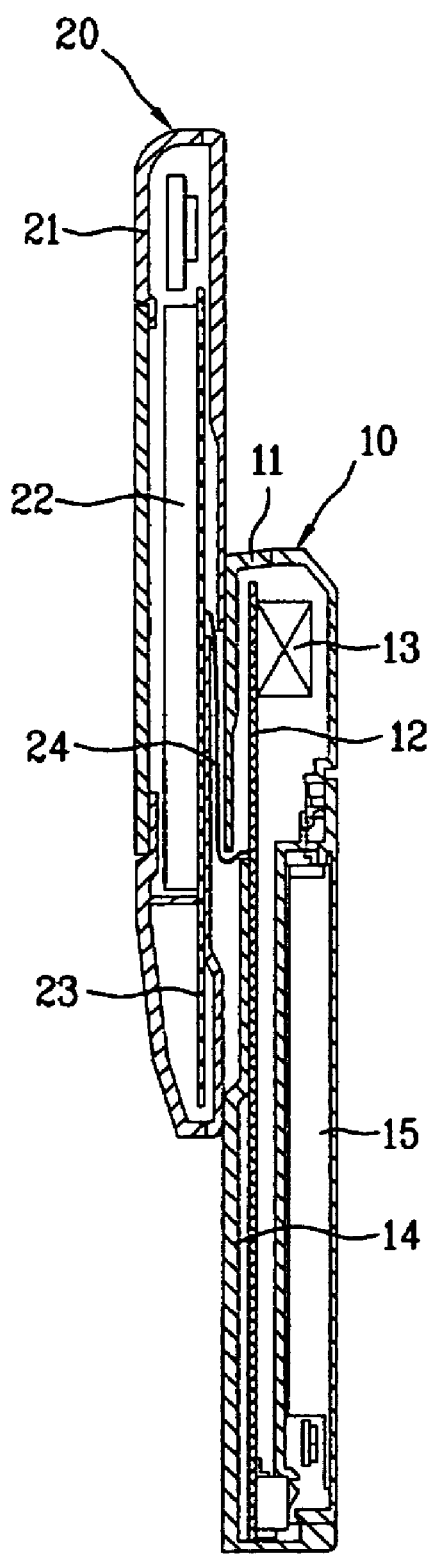
Figure 3:
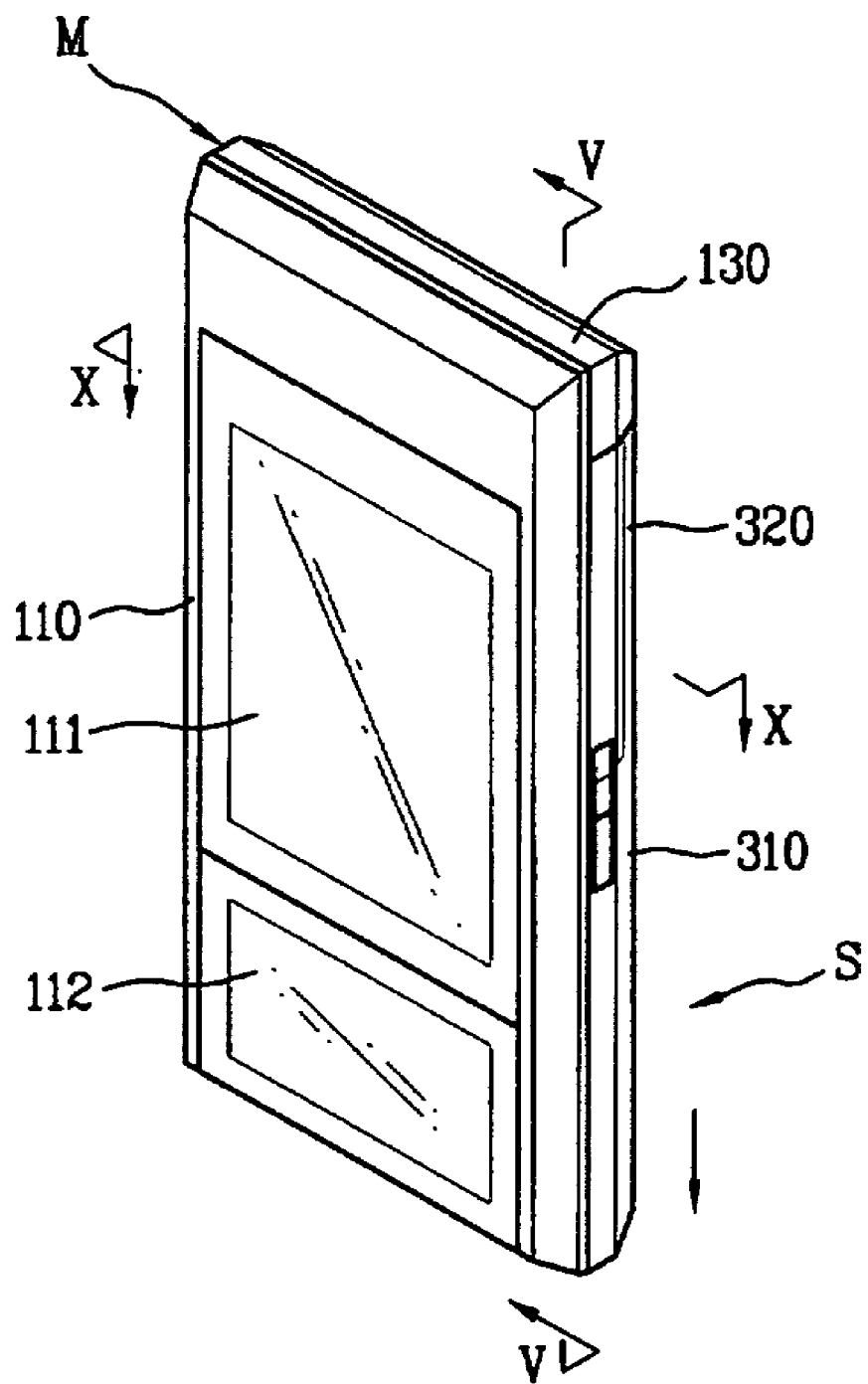
FIGS. 3 and 4 are perspective views illustrating a state where a mobile terminal of the present invention slides up and slides down, respectively.
Figure 4:
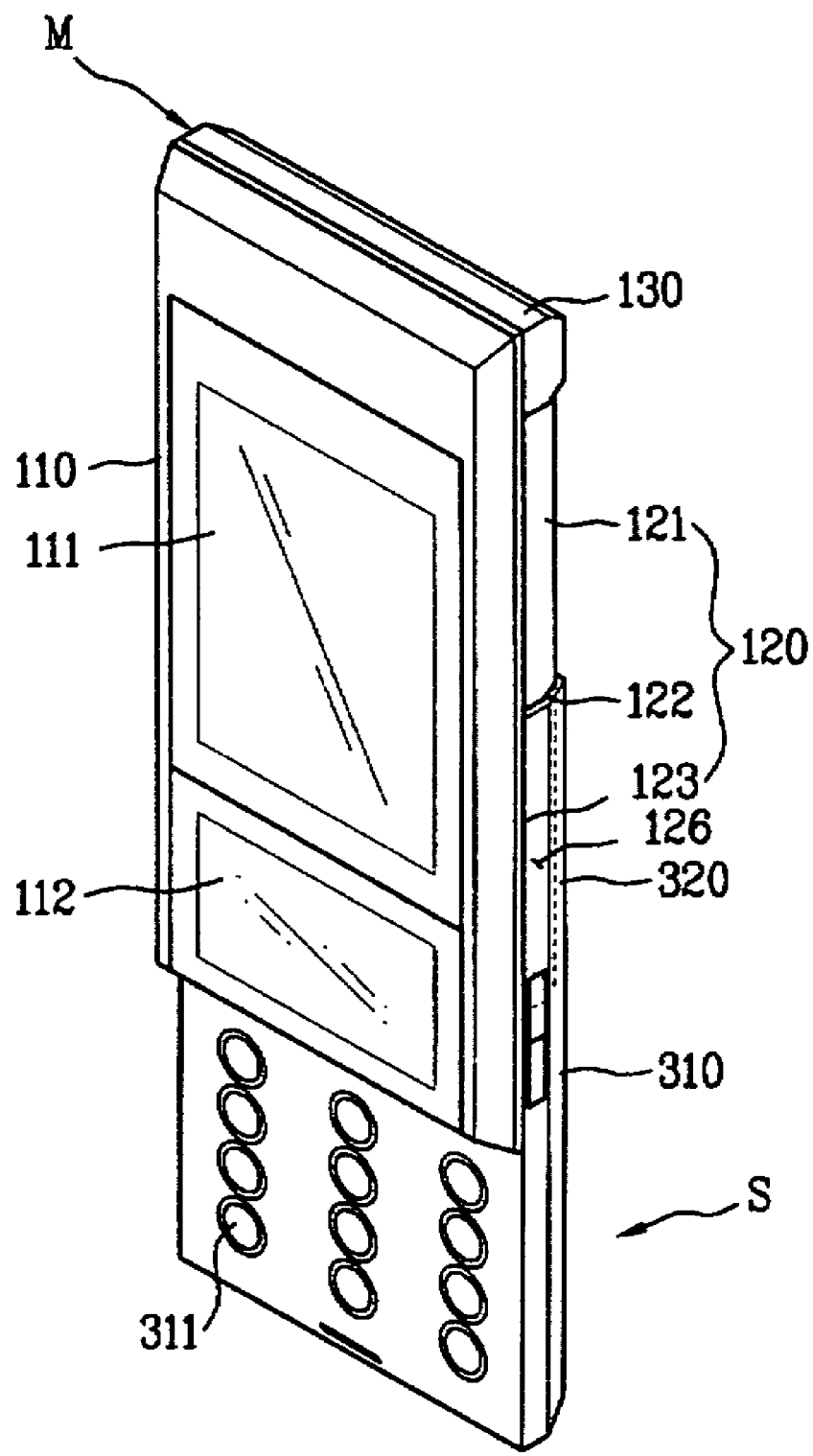

As shown in FIGS. 3 and 4, the mobile terminal of the present invention includes a main unit (M) and a slide unit (S) slidable on a rear part 120 of the main unit (M). The main unit includes a front part 110 in which a display window 111 is provided to display predetermined information, an upper end part 130 defining an upper end of the mobile terminal and the rear part 120 defining a rear surface of the mobile terminal. The front part 110 may also include an input device 112, such as a touch pad, a navigation key, a jog wheel, or other similar input devices. The slide unit (S) includes a slide body 310, a keypad 311 provided in front of the slide body 310 and a battery (not shown) detachable from a rear surface of the slide body 310.

The rear part 120 of the main unit (M) extends a predetermined distance from the upper end part 130 and includes a holding portion 121, a sliding part 123 and a stepped part 122. The holding portion 121 has a predetermined space to hold predetermined sub assemblies therein. The sliding part 123 is stepped toward a front portion from the holding portion 121 so that the slide unit (S) is slidable on the slide part 123 and detailed description of the sliding part 123 will be described in reference with other drawings later. The stepped part 122 is stepped a predetermined distance to connect the holding portion 121 with the sliding part 123. A cover portion 320 is formed on the slide unit (S) to cover the holding portion 121 when the slide unit (S) slides up, and to cover a rear space formed by the stepped part 122 and the slide unit (S) on the sliding part 123 when the slide unit (S) slides down.

Figure 5:
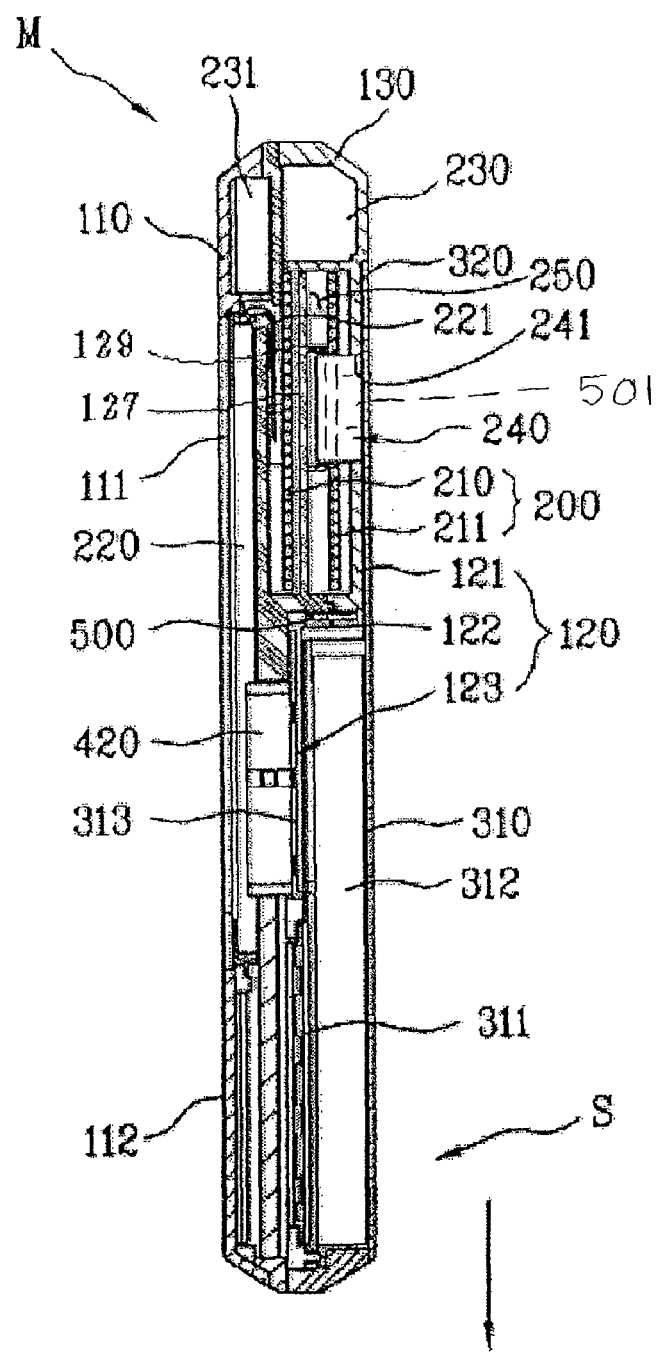
FIGS. 5 and 6 are side sectional view illustrating a state where a mobile terminal according to a first embodiment of the present invention slides up and slides down, respectively.
Figure 6:
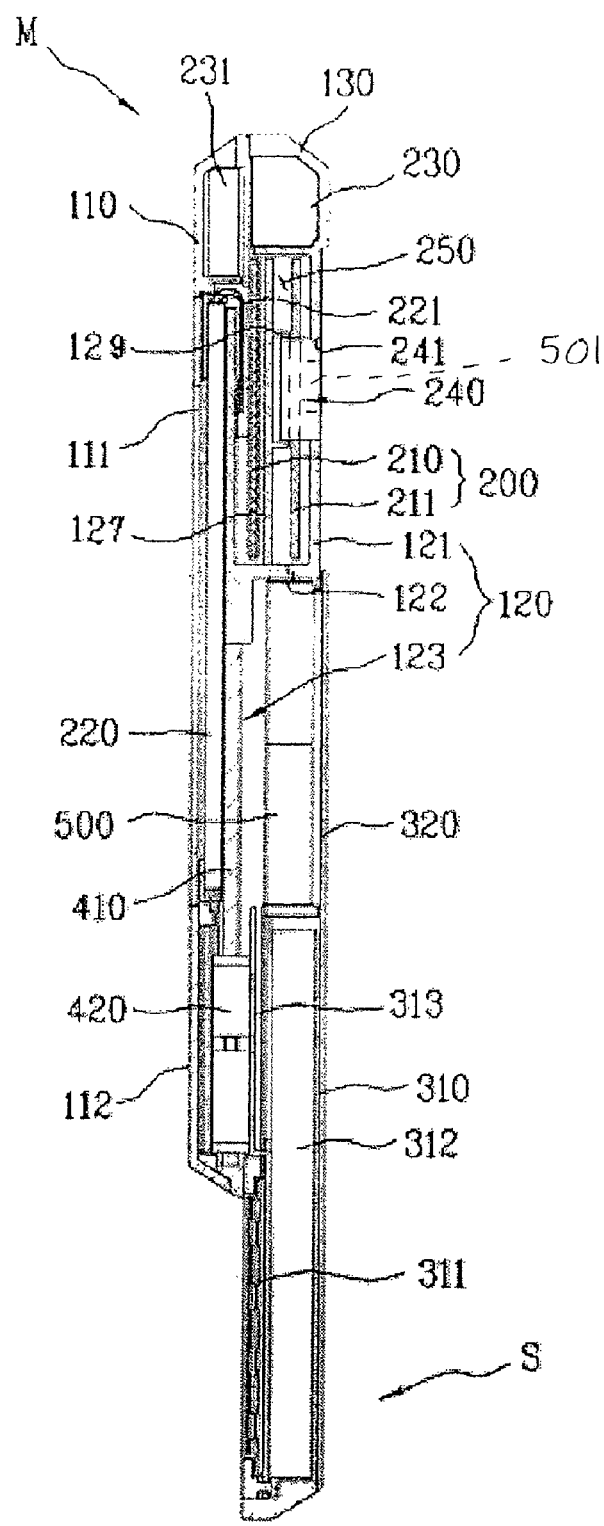
Figure 7:
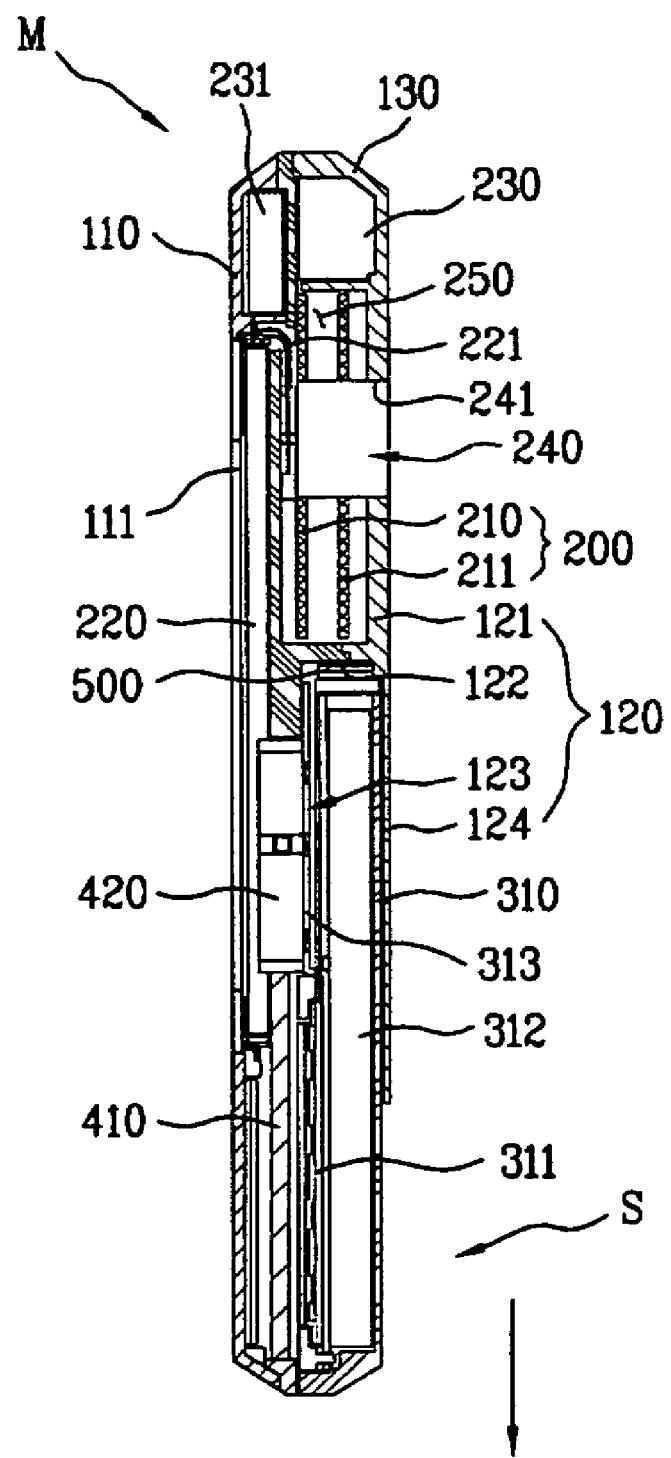
FIG. 7 is a side sectional view illustrating a state where a mobile terminal according to a second embodiment of the present invention.
Figure 10:
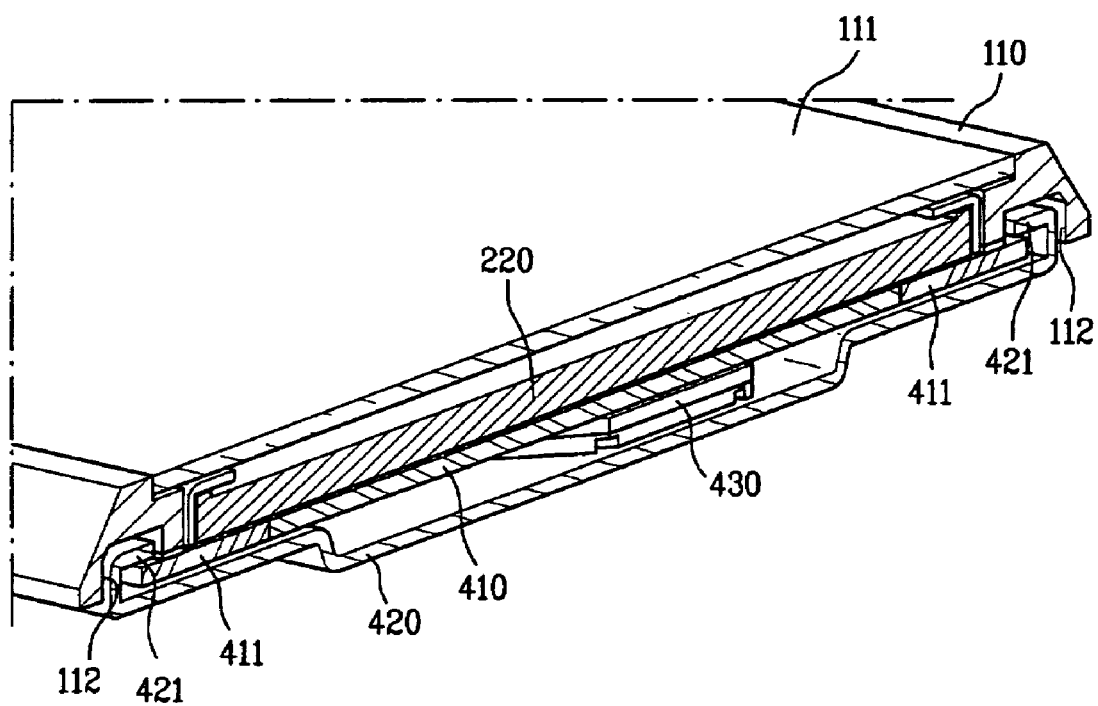
FIG. 10 is a sectional view illustrating a section of the mobile terminal shown taken along section line X-X in FIG. 3.

FIGS. 5 to 7 are sectional views illustrating a section of the mobile terminal according to various exemplary embodiments and taken along section line V-V shown in FIG. 3. FIG. 10 is a sectional view illustrating section of the mobile terminal taken along section line X-X shown in FIG. 3.

As shown in FIGS. 5 and 6, the main unit (M) includes the front part 110, the rear part 120 and the upper end part 130. A display 220 is installed in the front part 110 to display various kinds of information to a user through the display window 111. An antenna 230 is installed in the upper end part 130, which is a held antenna, to send/receive a wireless signal. A speaker 231 is installed in front of the antenna 230. Also, the rear part 120 of the mobile terminal is defined as extend from the upper end part 130 to a lower end of the mobile terminal.

The holding portion 121 is provided on a first portion of a rear of the display 220. The sliding part 123 is provided on a second portion of the rear of the display 220 to be stepped from the holding portion 121 for the slide unit (S) to slide thereon. The holding portion includes an internal member 127 that divides the holding portion into two chambers.

It is understood that the first portion of the rear of the display 220 could be an upper portion of the rear of the display 220, and the second portion of the rear of the display 220 could be a lower portion of the rear of the display 220. Hereinafter, the present invention is explained where the first portion of the rear of the display 220 indicates the upper portion of the rear of the display 220, and the second portion of the rear of the display 220 indicates the lower portion of the rear of the display 220.

As shown in FIGS. 5 and 6, the front part 110, the upper end part 130, the holding portion 121, and the stepped part 122 are formed in a case or housing of the main unit (M). The holding portion 121, the stepped part 122 and the sliding part 123 are provided in order from the upper end part 130 to the lower end of the mobile terminal.

The holding portion 121 defines a space 250, which includes the two chambers separated by the internal member 127 provided in the first portion of the rear of the display 220. The stepped part 122 is formed between the holding portion 121 and the sliding part 123 provided in the rear part 120, and the width of the holding portion 121 is thicker than the width of the sliding part 123. As a result, a predetermined internal space, space 250, is formed in the holding portion 121 of the rear part 120 and a predetermined external space is formed outside of the sliding part 123.

A plurality of circuitry supporting substrates 200 are installed in space 250 in the holding portion 121 and the sliding unit (S) slides in the external space formed by the sliding part 123.

The circuitry supporting substrates 200 are installed in the holding portion 121. In a conventional mobile terminal, one main circuitry supporting substrate is longitudinally installed from an upper end to a lower end of the conventional mobile terminal. However, in the mobile terminal of the present invention, a plurality of circuitry supporting substrates 210 and 211, each being formed shorter in the length than the one main circuitry supporting substrate of the conventional mobile terminal, are adjacent to each other enough to be overlapped in space 250. Thereby, the thickness between the front part 110 and the sliding part 123 may be slimmer because the circuitry supporting substrates 200 do not extend therein.

Since the thickness of the portion where the holding portion 121 is provided, that is the thickness of the stepped part 122, is approximately similar to the thickness of the slide unit (S), space efficiency is enhanced overall and the mobile terminal efficiently utilizes what would otherwise be useless space so that the thickness of the mobile terminal can be slimmer. As a result, the functions of the mobile terminal of the present invention can be the same as those of the conventional mobile terminal, but the overall thickness of the mobile terminal of the present invention is slimmer.

Also, it is preferred that the holding portion 121 and the slide unit (S) are substantially aligned on the rear of the display 220.

In this first exemplary embodiment, the plural circuitry supporting substrates 200 are partial circuitry supporting substrates, which replace a main circuitry supporting substrate used in the conventional mobile terminal. That is, since the main circuitry supporting substrate is installed over substantially the entire length of the conventional mobile terminal, there is a problem that useless space is created. To solve the problem, the main circuitry supporting substrate is adapted as partial circuitry supporting substrates installed in what would otherwise be useless space appropriately. Alternatively, the main circuitry supporting substrates or all of the circuitry supporting substrates installed in the mobile terminal, for example, a circuitry supporting substrate for the display, may be partial circuitry supporting substrates.

Also, since the antenna 230 is provided in the upper end part 130 of the main unit (M) in the front part 110 above the holding portion 121, there is no limitation of antenna installation space like that found in the prior art and the installation space of the antenna 230 is located to overcome the problem that the conventional mobile terminal is thicker due to an auxiliary space for an antenna.

Meanwhile, the display 220 installed between the front part 121 and the sliding part 123 is electrically connected to the circuitry supporting substrates 200 through a connection member 221. Preferably, the connection member 221 is a flexible circuitry supporting substrate. Unlike the conventional element required to connect the main circuitry supporting substrate and the LCD in the conventional mobile terminal, which passes through the LCD part and the body part and needs to be longer to allow for movement of the LCD part with respect to the body part, the connection member 221 of the present invention is installed in spare space formed in an upper portion within the main unit (M) to connect the display 220 to the circuitry supporting substrates 200. Thereby, the inner structure of the mobile terminal may be simpler and the mobile terminal may be slimmer.

The slide unit (S), which is slidable on the sliding part 123, includes a slide body 310, a keypad 311 and a battery 312. The slide body 310 defines an exterior of the slide unit (S) and the keypad 311 is installed on a surface of the slide body 310 for a user to operate a key. The battery 312 is attachable/detachable to/from the other surface of the slide body 310 to supply power to the mobile terminal.

A rear surface of the case defines an exterior of the main unit (M) may form a sliding part 123 so that the slide unit (S) may slidingly move on the rear surface of the case provided in the main unit (M).

If a sliding device for semi-automatic sliding is installed between the rear surface of the case and the slide unit (S), the mobile terminal may be thicker. Thus, when the rear surface of the case provided in the main unit (M) is removed, it is preferred that the sliding device forms the rear surface of the case. That is, the sliding device defines a rear surface of the main unit (M) and the sliding device is a sliding part 123, as shown in FIGS. 5 and 6.

As shown in FIGS. 5 and 6, the sliding part 123 is the sliding device, which includes a plate 410, a slide member 420 and an elastic device 430 (not shown, see FIGS. 13 and 14). The slide member 420 slides on a rear surface of the plate 410 and the elastic device (not shown) is installed between the slide member 420 and the plate 410. The detailed description of the sliding device formed as a sliding part 123 will be described with reference to FIG. 13.

As shown in FIG. 10, a display window 111 is provided on a front part 110 and defines a front surface of the mobile terminal according to the present invention. The display 220 is installed in the display window 111 and a plate 410 is provided on a rear of the display 220.

That is, the plate 410 is installed on the lower portion of the rear of the display. The plate 410 has both opposite sides protruded from the display 220. The width of the plate 410 is longer than that of the display 220.

The slide member 420 is slidable on the rear surface of the plate 410. The slide member 420 has a combining part 422 connected to the slide unit (S), and a pair of rail parts 421 are provided on opposite sides 411 of the slide member 420 and rail parts 421 slide on the sides 411 of the plate 410, wherein the side ends of the rail parts 421 are positioned adjacent to the sides of the display 220.

Each of the rail parts 421 is bent to cover respective ends 411 of the plate 410 so that the slide member 420 may slide upwardly/downwardly along the side ends 411 of the plate 410.

Since the slide member 420 is connected to the slide body 310 of the slide unit (S), the slide unit (S) may slide on the plate 410 together with the slide member 420. Since the rail part 421 is sliding on a side surface of the display 220, not on a rear surface of the display 220, the mobile terminal can be slimmer. That is shown in side sectional views of FIGS. 5 to 7. Seen from a side of the mobile terminal, the slide member 420 slidingly moves on a side surface of the display 220.

In the exemplary embodiment shown, a guiding groove 112 is formed on both sides of the front part 110 so that the rail part 421 may slide in the guiding groove 112.

Figure 8:
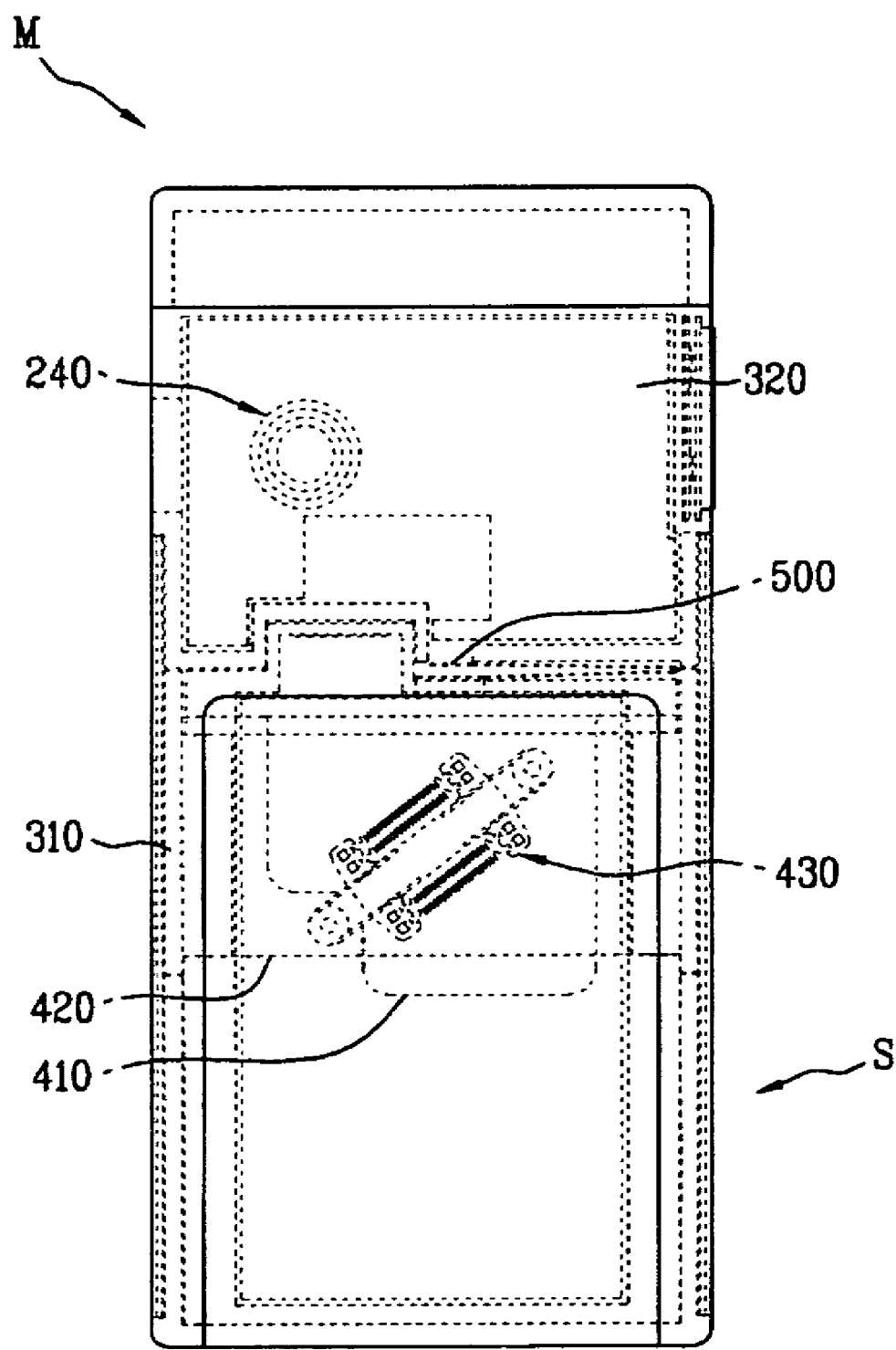
FIGS. 8 and 9 are diagrams illustrating a rear surface of the mobile terminal in the state of FIGS. 5 and 6.
Figure 9:
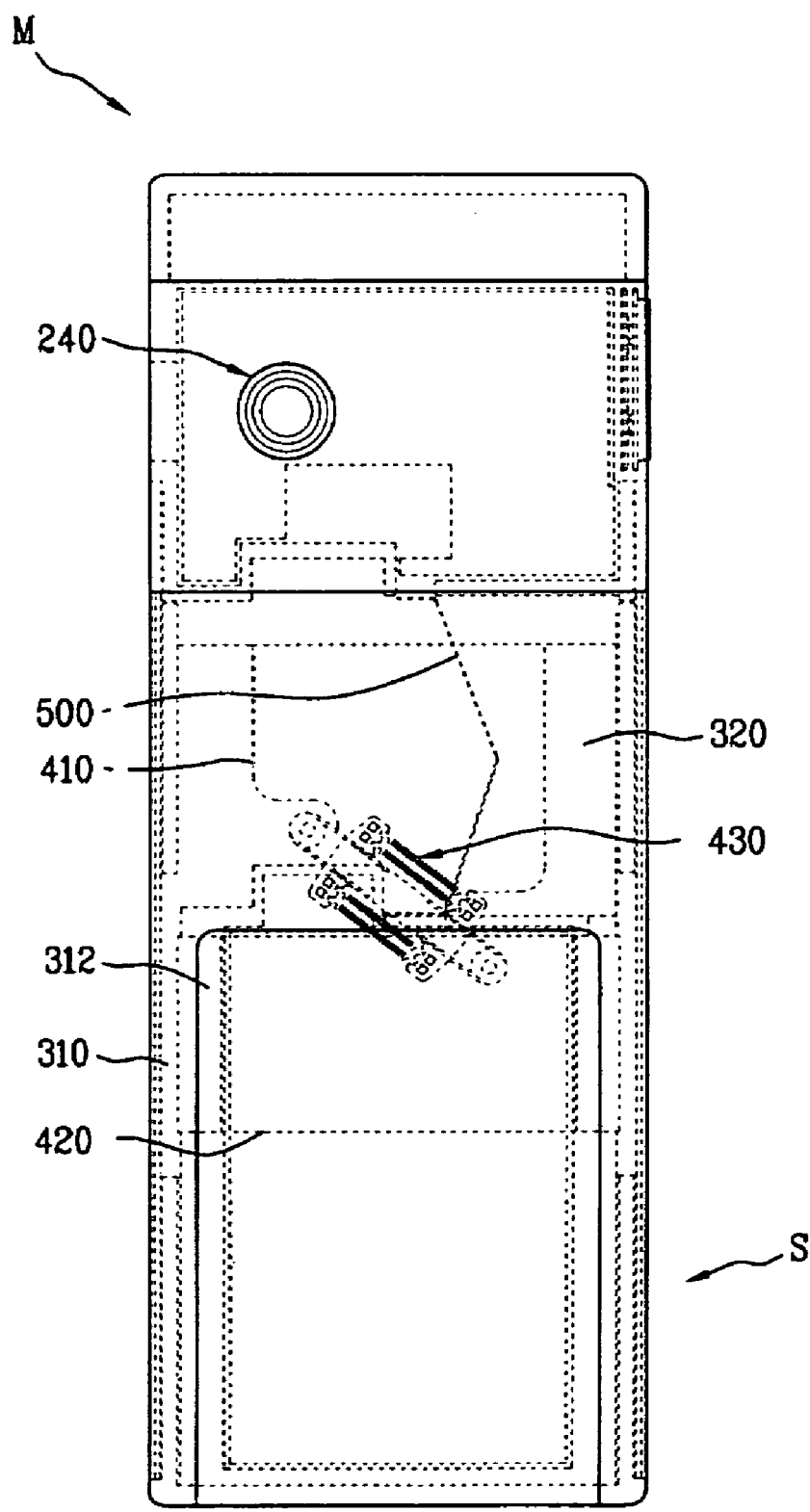
Figure 11:
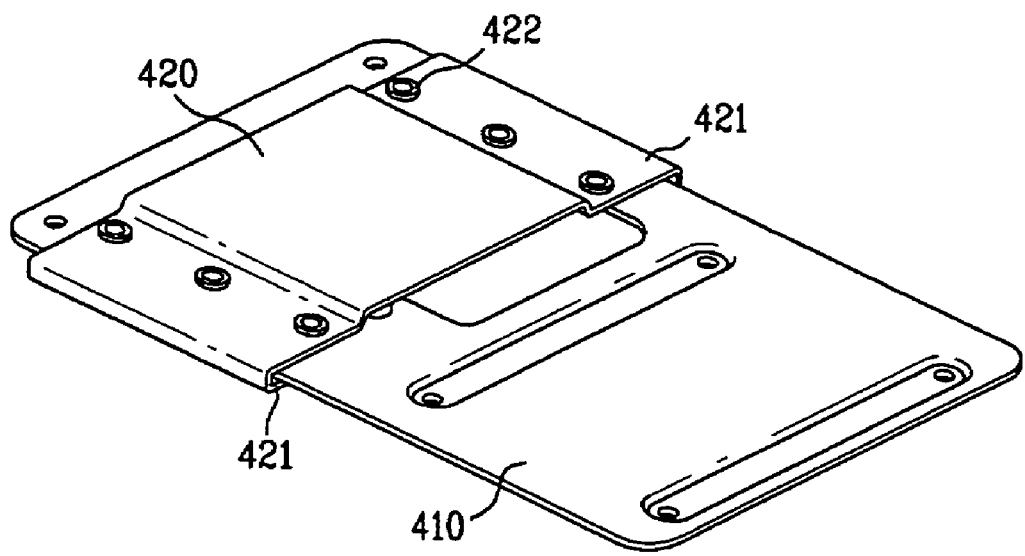
FIG. 11 is a diagram illustrating a sliding device provided in the mobile terminal of the present invention.
Figure 11:
Figure 11:
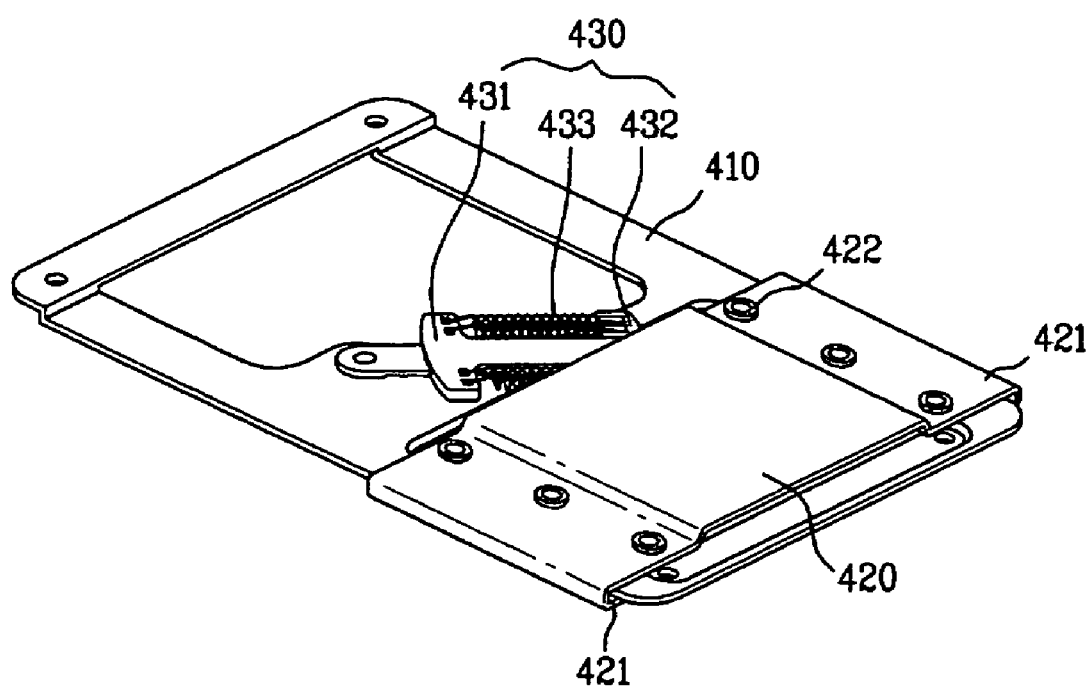

That sliding motion is shown in FIGS. 8 and 9 of a rear surface of the mobile terminal illustrating the sliding motion in detail and FIG. 11 illustrates the sliding device installed on a rear surface of the display part 220 in detail, which will be described later.

With reference to the rear surface structure of the mobile terminal shown in FIGS. 8 and 9, a first embodiment of the present invention illustrated in FIGS. 5 and 6 will be described. A flexible circuitry supporting substrate 500 is arranged between the stepped part 122 and an upper end of the slide body 310 to connect at least one of the plurality of circuitry supporting substrates 210 and 211 to the slide unit (S). The flexible circuitry supporting substrate 500 transmits/processes an electric signal among the keypad 311 and the battery 312 of the slide unit (S), and the circuitry supporting substrates 200, and is repeatedly folded/unfolded by the sliding motion of the slide unit (S). That is, when the slide unit (S) slides down (see FIGS. 5 and 6), the flexible circuitry supporting substrate 500 is unfolded. When the slide unit (S) slides up, the stepped part 122 is spaced apart from the slide body 310 a predetermined distance to provide the least amount of space to hold the flexible circuitry supporting substrate 500.

As shown in FIGS. 5 to 7, the flexible circuitry supporting substrate 500 is installed in a rear space formed by the stepped part 122, the sliding part 123, and the slide body 310. Preferably, a cover member is provided to cover the rear space so that the flexible circuitry supporting substrate 500 is prevented from being exposed outside.

A cover member may be provided in the various embodiments. FIGS. 5 and 6 illustrate an exemplary embodiment of the cover member. The cover member is embodied as a cover portion 320 extending from the slide body 310 of the slide unit (S) toward the upper end part 130. The cover portion 320 may be fastened to the slide body 310 of the slide unit (S) or be formed as one body with the slide body 310. When the slide unit (S) slides up (see FIGS. 5 and 8), the cover portion 320 covers the holding portion 121 of the main unit (M). When the slide unit (S) slides down (see FIGS. 6 and 9), the cover portion 320 covers the rear space formed by the stepped part 122, the sliding part 123, and the slide body 310.

As shown in FIGS. 5 and 6, a camera 240 of the mobile terminal according to the first embodiment of the present invention is provided in the holding portion 121 to be exposed outside. A seating hole 241 is formed on a portion of the holding portion 121 where the camera 240 is provided to prevent the camera 240 from being projected outside. The camera 240 is projected toward the inside of the holding portion 121. When the camera 240 is a large pixel camera, such as 1.5 megapixels to ten megapixels, the camera 240 is generally thicker than for smaller pixel sized cameras. As a result, a hole is formed in at least one circuitry supporting substrate 211 adjacent to the holding portion 121 to insert the projected portion of the camera 240 therein. It is understood that when the camera 240 is not so thick, the camera 240 may be installed without the hole.

In this first exemplary embodiment, internal member 127 supports the circuitry supporting substrate 211. A wall structure 129 is formed on a surface of the internal member 127 to enclose two or more sides of the camera 240. This helps to protect the camera 240 and prevents it from shifting too far from impacts applied to the mobile terminal. A flexible circuitry substrate 501 connects the camera 240 to the circuitry supporting substrate 211 in such a manner that the camera 240 is supported without contacting the wall structure 129. Preferably, the wall structure 129 surrounds three sides of the camera 240 to allow for the flexible circuitry supporting substrate to be connected to the remaining edge of the camera 240.

Since the camera 240 is not projected outside, the cover portion 320 may slidingly move without any interference when the slide unit (S) slidingly moves. When the slide unit (S) slides up, the cover portion 320 covers the camera 240, and the camera 240 cannot be used (see FIGS. 5 and 11). When the slide unit (S) slides down, the camera 240 is exposed and it can be used (see FIGS. 6 and 12). The camera 240 may take a picture, a moving picture, a picture for special effects and all other possible pictures.

FIG. 7 illustrates a second exemplary embodiment of the camera arrangement in the mobile terminal according to the present invention. As shown, the camera 240 passes through both circuitry supporting substrates 200. The camera 240 can be connected to either of the circuitry supporting substrates 200.

The other configurations of the second embodiment shown in FIG. 7 are similar to those of the first embodiment except the internal member 127 and wall structure 129 have been eliminated. More specifically, the configuration of the main unit including the front part 110, the upper end part 130, the display 220, the antenna 230, and the configuration of the slide unit (S) are the same as those of the first embodiment. The configuration of the sliding part 123 including the plate 410, the slide 420, and the elastic device 430 is also the same as that of the first embodiment, except that the camera 240 is not covered by the cover portion 124 and is always exposed.

As shown in FIG. 11, the sliding device of the exemplary embodiments will be described in further detail. A slide member 420 is installed on a rear surface of the plate 410 to slidingly move. A rail part 421 is bent at both opposite side ends of the slide member 420 to cover the opposite side ends of the plate 410 so that the slide member is slidable on the plate 410. A combining hole 422 is provided on a rear surface of the slide member 420 to be combined with a connecting part 313 (see FIGS. 5 to 7) of the slide unit (S).

An elastic device 430 is installed between the plate 410 and the slide member 420. The elastic device includes a first member 431 rotatably fixed to a side of the plate 410 and a second member 432 rotatably fixed to the slide member 420 so that the first member 431 and the second member 432 are alternated such that a predetermined portion of the first and second member 431 and 432 may be overlapped. Also, an elastic member 433 connects the first member 431 and the second member 432 of the elastic device 430 and has a predetermined tension.

Thus, when the slide member 420 is moved a predetermined distance by a predetermined external force such that the slide member 420 slides either upward or downward, the first member 431 and the second member 432 of the elastic device 430 are overlapped more and the elastic member 433 receives maximum tension to maximize elastic restitution. Once the elastic member 433 reaches maximum tension, any further motion upward or downward is assisted by the elastic member 433 as it returns to the pre-tensed state.

With reference to FIGS. 8 and 9, the sliding motion of the mobile terminal according to the present invention will be described. The FIGS. 8 and 9 illustrate the above semi-automatic sliding motion. When a user applies a predetermined external force to slide the slide unit (S) downwardly from a closed state shown in FIG. 8, the elastic device 430 assists due to the elastic restitution to move the slide unit (S) to an open state shown in FIG. 9.

The mobile terminal having the above configuration has an advantageous effect that the mobile terminal may be slimmer, because the limitation of the prior art is overcome and it utilize what would otherwise be useless space. Also, when the slide unit (S) slides down, the upper portion of the mobile terminal may have relatively heavier weight to give a user confidence in the strength of the main unit (M). Thereby, the mobile terminal of the present invention has another advantageous effect that usage satisfaction of the mobile terminal may be enhanced. Furthermore, larger sized cameras may be accommodated than in conventional mobile terminals.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed:
1. A mobile terminal comprising:
   a main unit including:
      a housing including a holding portion, a sliding part and a stepped part provided between the holding portion and the sliding part;
      a display provided in a front part of the housing;
      two overlapped circuitry supporting substrates located in the holing portion of the housing, and one of the circuitry supporting substrates having an opening formed therein;
      a camera arranged in the opening of the circuitry supporting substrate such that a lens of the camera is exposed to the exterior of the housing; and
      an internal member for supporting the circuitry supporting substrate having the opening, the internal member being located between the two circuitry supporting substrates and including a wall structure configured to surround at least two edges of the camera;
a slide unit slidable on the main unit, the slide unit including:
a slide body;
a keypad provided in a front surface of the slide body; and
a battery detachable from a rear surface of the slide body; and
a first flexible circuitry supporting substrate arranged between the stepped part of the housing and an upper end part of the slide body to connect at least one of the two circuitry supporting substrates to the slide unit,
wherein the camera is connected to the circuitry supporting substrate having the opening by a second flexible circuitry supporting substrate, and the camera is not fixed to the wall structure,
wherein the wall structure of the internal member is formed integrally with the internal member, and the wall structure extends toward the circuitry supporting substrate having the opening, and
wherein the holding portion is positioned between an upper end part of the housing and the stepped part of the housing.

2. The mobile terminal according to claim 1, wherein the wall structure of the internal member contacts the surface of the circuitry supporting substrate having the opening.

3. The mobile terminal according to claim 1, wherein the two overlapped circuitry supporting substrates and the internal member have corresponding sizes.

4. The mobile terminal according to claim 1, wherein the wall structure of the internal member surrounds three sides of the camera to allow for the second flexible circuitry supporting substrate to be connected to the remaining edge of the camera.

5. The mobile terminal according to claim 1, wherein the wall structure of the internal member supports the camera in a predetermined direction parallel with the circuitry supporting substrate.

6. The mobile terminal according to claim 1, wherein the size of the opening corresponds to the width of the camera.

7. The mobile terminal according to claim 1, wherein the thickness of the slide unit corresponds to the thickness of the stepped part of the main unit.

8. The mobile terminal according to claim 1, wherein the slide unit has a cover portion configured to cover the holding portion when the slide unit slides up and to reach the stepped part when the slide unit slides down.

9. The mobile terminal according to claim 1, wherein the two overlapped circuitry supporting substrates have corresponding lengths, widths or areas.

10. A mobile terminal comprising:
a first body having a display;
a second body coupled slidably to the first body, and having a keypad provided in a front surface and a battery detachable from a rear surface of second body;
two overlapped circuitry supporting substrates located in an upper portion of the first body, one of the circuitry supporting substrates having an opening formed therein;
a first flexible circuitry supporting substrate arranged between a lower end of the first body and an upper end of the second body to connect at least one of the circuitry supporting substrates to the second body;
a camera arranged in the opening of the circuitry supporting substrate such that a lens of the camera is exposed to a rear surface of the second body; and
an internal member for supporting the circuitry supporting substrate having the opening, the internal member being located between the two circuitry supporting substrates and including a wall structure configured to surround at least two edges of the camera,
wherein the camera is connected to the circuitry supporting substrate by a second flexible circuitry supporting substrate, and the camera is not fixed to the wall structure, and
wherein the maximum thickness of the mobile terminal is less than the sum thickness of the first body and the second body by forming a stepped part at one of the first body and the second body.

11. The mobile terminal according to claim 10, wherein the wall structure is formed integrally with the internal member and the wall structure of the internal member is extended toward the circuitry supporting substrate having the opening.

12. The mobile terminal according to claim 11, wherein the wall structure of the internal member is perpendicular to the circuitry supporting substrate for preventing the movement of the camera.

13. The mobile terminal according to claim 12, wherein the wall structure of the internal member supports the camera in a predetermined direction parallel with the circuitry supporting substrate.

* * * * *